Jan. 19, 1971  SHIGEO KOJIMA  3,555,869
METHOD OF MANUFACTURING ELECTRICALLY WELDED PIPES
Filed Aug. 19, 1968
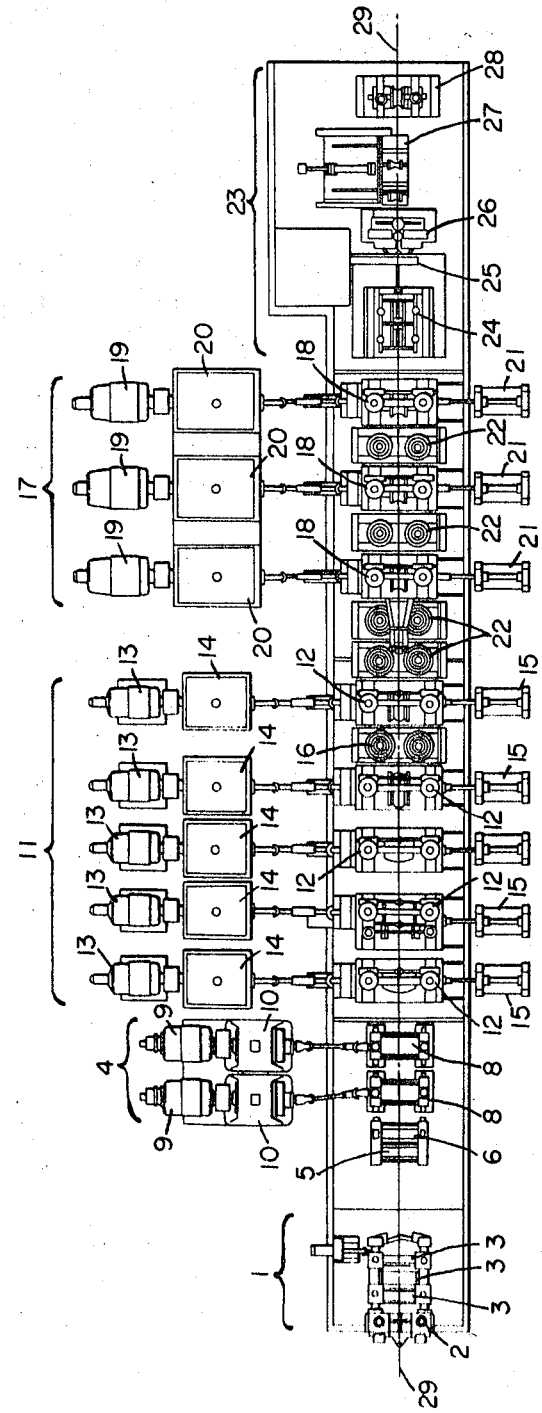
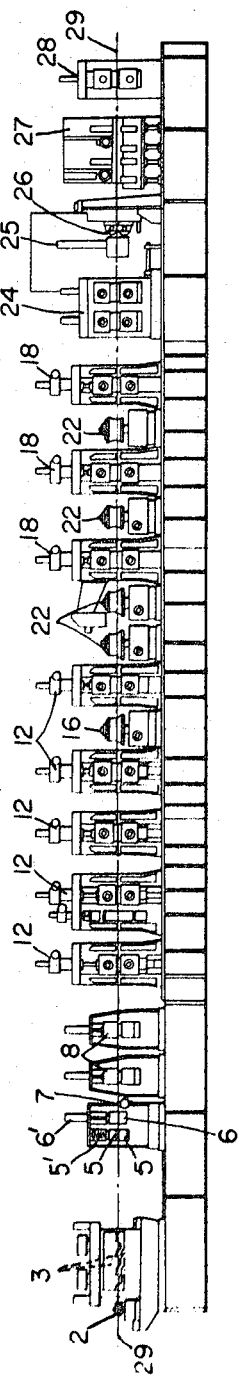

United States Patent Office

3,555,869
Patented Jan. 19, 1971

3,555,869
METHOD OF MANUFACTURING ELECTRICALLY WELDED PIPES
Shigeo Kojima, Kawasaki-shi, Japan, assignor to Nippon Kokan Kabushiki Kaisha
Filed Aug. 19, 1968, Ser. No. 753,687
Claims priority, application Japan, Aug. 25, 1967, 42/54,213
Int. Cl. B21b 15/00
U.S. Cl. 72—177        6 Claims

ABSTRACT OF THE DISCLOSURE

A pre-treated steel strip is subjected to a working strain of 0.3 to 2.0% and is then concurrently formed into a pipe-shaped (or tubular) configuration while the strain is still being applied. The method will produce high quality electric-resistance welded pipe from continuous metal blanks or strips.

BACKGROUND OF THE INVENTION

This inveniton relates in general to an improved method of manufacturing electrically welded pipes and, more particularly, to a method of manufacturing high quality electric-resistance welded pipes.

The term "pipe" is used throughout the specification and claims to describe the process formed by the present invention. It is understood that the term "pipe" refers also to tubular-shaped products and the like, the term pipe and tube being used interchangeably.

In contrast with pipes which are formed by forging steel strips at high temperatures, electric-resistance welded pipes formed at relatively low temperatures, in general, are widely used not only for mechanical and structural purposes but also in such demanding fields of applications, as for example, pressure distribution pipes, heat exchangers, boiler tubes and the like. Consequently, a high degree of accuracy and proficiency is required in processes for manufacturing these pipes. Particularly, the properties of the blank or sheet in the forming or pipe shaping manufacturing step is the basic or most significant factor that governs the quality of the finished pipe product. In conventional electric-resistance pipe welding machines, it has been the accepted practice to utilize washing, cleaning, levelling, trimming and similar devices for the pre-formed steel strips. In a continuous pipe welding installation, in order to join adjacent or contiguous strips into a single continuous steel web, a shear, welder and loopers are generally required in addition to the above mentioned devices. However, even when employing these additional devices, unsatisfactory welds are frequently obtained due to the uneven quality of the steel web or blank. In addition, the irregular shapability of the steel strip also quite often results in rejected pipe products. Non-uniform strain remaining in the final pipe products also frequently causes failure of the pipes after installation or during operation. In summation, as has been pointed out hereinbefore, electrically welded pipes, and particularly electric resistance welded pipes must possess extremely high physical qualities in view of their uses as pressure distributing pipes, heat exchanger tubes, boiler tubes and the like.

According to the research and experimentation by the applicant, it has been ascertained that the shapability of the steel strip prior to entering the shaping or pipe forming machine is the principal or single major factor which influences the quality of the finished steel product, in addition to the other prime factor of the quality of the steel blank. As is well known in the art, with the exception of the so-called thick steel plates, medium gauge steel sheets having a thickness of less than 6 mm., or thin steel sheets, are frequently subject to unavoidable defects as a result of the rolling process. More particularly, with present day rolling mills, it is almost impossible to maintain uniform gauge thickness in the sheets in the direction transverse to the feed direction of the rolled sheets. Notwithstanding various improvements in the method of using cooling rolls and in their crown dimensional control, any decidedly effective method of eliminating these problems has not yet been found. Thus, unsatisfactory forming or pipe shaping due to nonuniform transverse sheet thickness, for example, sheet edge corrugation (or wavy edges) and sheet elongation at the central portion thereof (or center buckles) have not yet been successfully eliminated. For this reason, it is almost a certainty that unsatisfactory welds or structural defects are caused by non-uniform strain in the sheets when pipes are manufactured from such defective steel sheets or strips. In order to eliminate these defects it has been proposed to improve the quality of the strip by passing it through a skin pass mill, or by installing a leveller on the infeed end of an electric-resistance-welded pipe manufacturing line. However, these approaches have not yet been proven to be satisfactory. First, the installation of a skin pass mill adds greatly to the cost of installation, thus increasing the pipe manufacturing cost. Second, after a predetermined time interval subsequent to the skin mill pass, the yield point elongation of the steel strip may recover thereby lowering the quality of the material and requiring strict process control. With regard to the leveller, it has been found that it is rather difficult to obtain an effect on the steel sheet or strip comparable with that provided by the skin pass mill. Accordingly to experimentation, even with an increased sheet feed rate into the leveller, the above mentioned defects, such as edge wave and central sheet portion elongation, could be eliminated, but new defects, such as cross-bowing (also known as a "saddle-shaped" deformation) would in all likelihood result. The occurrence of this type of new and unexpected problem offsets the merit of the leveller and renders it unsatisfactory to a large degree.

SUMMARY OF THE INVENTION

This invention obviates and eliminates these problems, encountered in the technology, and according to the basic concept thereof, the blank or steel strip is shaped or formed into a pipe while it is subjected to an internal working strain under an appropriate tensile load. In this regard, according to the present invention when the working strain is imposed on the strip in two distinct stages, it becomes possible to manufacture electric-resistance-welded pipes possessing superior physical properties and characteristics. Thus, just before the strip or blanks are fed to a pipe forming or shaping machine, subjecting the strip to a working strain in the so-called material plastic deformation region under tension load, results in various advantages. First, pipe forming or shaping becomes readily possible without the previously encountered accompanying dimensional inaccuracies caused by steel sheet or strip spring back. Second, the sheet or strip material can be shaped or formed into pipe under a material yield strength that has been reduced to a minimum. These combined factors greatly contribute to maintain the physical properties of the pipes or welded tubes at their optimum values, thereby attaining the basic objects of this invention.

BRIEF DESCRIPTION OF THE DRAWINGS

The invention may be more fully and clearly understood from the following detailed description taken in connection with the accompanying drawings:

FIG. 1 shows a plan view of a preferred embodiment of this invention and illustrates the shaping or pipe forming machine for carrying out the method of this invention; and FIG. 2 shows a side view of the pipe forming machine of FIG. 1.

DESCRIPTION OF THE PREFERRED EMBODIMENT

Referring in detail to the drawings, FIG. 1 shows a plan view of a pipe shaping or forming machine as installed in an electrically welded pipe manufacturing assembly or production line. For purposes of clarity, various machines in the production line preceding the pipe forming or shaping machine have been omitted from the drawing. At the infeed end of the pipe shaping machine there are installed a group of idler rollers 1 including a pair of vertical input (or entry) rollers 2 and a plurality of idler rollers 3. Downstream of these idler rollers 3 the assembly includes two pairs of rollers 5 and 6 and a roller 7. The upper roller 5 is spring biased by a spring 5', while the upper roller 6 is actuatable in the vertical direction through operation of a cylinder mechanism 6'. A set of pinch rollers 4 is located downstream of rollers 5, 6 and 7. Pinch rollers 4 comprise a plurality of pairs of pinch rollers 8 which are driven by a pair of drive motors 9 through a pair of speed reduction gears 10. A series of breakdown rolling mill assemblies 11 each comprise the main body of a rolling mill 12, a drive motor 13 for the rolling mill, a speed reduction gearing 14, a replacement mill stand 15, and vertical guide rolls 16. As illustrated, a series of line pass rolling mill assemblies 17 each comprise the main body of a rolling mill 18, a drive motor 19 for the rolling mills 18, a speed reduction gearing 20, a replacement mill stand 21, and vertical guide rolls 22. A high frequency electrical resistance welding machine, generally indicated by reference numeral 23, includes seam guide rolls 24, the main portion of a welding machine 25, squeezing rolls 26, a cutter 27 for removing weld beads on the outer surface of the welded pipe, and ironing rollers 28. The pass line of the above described machines is designated by the imaginary line 29.

In shaping or forming a pipe with the pipe manufacturing machines described hereinabove, the tension applied to the sheet or strip material, in accordance with this invention, is maintained between the first stand of the series of the breakdown rolling mill assemblies 11 and the group of idler rollers 1. This tension must exceed the yield point of the blank strip, and may be readily provided by dividing the idler rollers into two groups with their upper and lower rollers respectively placed in a zig-zag arrangement, and also by a suitable selection of the number of rollers, spacing between adjacent rollers and the vertical positions and offset of the rollers with respect to the pass line 29. Alternatively, the required tension or load exceeding the yield point of the blank strip may be imparted by providing suitable driving means for these rollers and by establishing a predetermined relationship between the peripheral speed of these rollers and that of the rolls of the first breakdown stand. However this measure may not be satisfactory because a severe load is imposed upon the rolls of the first breakdown stand. It has been found by the applicant that unexpectedly good results may be obtained by installing a group of pinch rollers between the group of idler 1 rollers and the rolls of the first breakdown stand 11. A preferred embodiment of these pinch rollers is illustrated at 4 in FIGS. 1 and 2. Independently driven pinch rollers 8 are installed just downstream of the breakdown stand, and accordingly between these pinch rollers and idler rollers installed on the infeed (just before the breakdown stand) end there are provided the idler rollers 6 which are actuatable in the vertical direction by means of cylinder mechanism 6'. In this instance, immediately below or downstream of idler rollers 6, a simple guide roller 7, and immediately above or upstream of idler rollers 6, are provided paired rollers 5 having their lower roller fixed and upper roller sping biased, whereby stable working strain working on the strip material may be readily provided. Thus, the effect of dividing the shaping or pipe forming operation into the (a) primary plastic deformation effected through the tension applied by the group of idler rollers 1 and by the material bending, and the (b) secondary plastic deformation effected by driven pinch rollers and cylinder actuated rollers, is significant so as to readily provide the required material working strain with a load of less than one-half of the load provided by tension alone. In order to provide further understanding of the invention, the following example is given:

Chemical analysis of the steel sheet blank employed:

| | Percent |
|---|---|
| C | 0.13 |
| Si | 0.20 |
| Mo | 0.51 |

Mechanical properties:
Yield point: 21.0 kg./mm.$^2$, ultimate tensile strength: 37.1 kg./mm.$^2$ Sheet thickness: 4 mm.

In shaping or forming this blank into an electric-resistance-welded pipe, the following specifications were used for the group of idler rollers 1 as shown in FIGS. 1 and 2.

Roller diameter: 120 mm.
Number of upper rollers: 3
Roller offset: 3.2 mm.
Center-to-center distance between rollers: 140 mm.
Number of lower rollers: 2

Specifications for the group of pinch rollers 4:

Pinch roller diameter: 320 mm.
Cylinder operated roller offset: 120 mm.
Diameter of a set of three rolls: 110 mm.

With these specifications for the idler and pinch rollers, one-inch welded pipe was formed when subjected to a tension of approximately 4 kg./mm.$^2$ per unit area of the blank strip, and it was determined that a strip elongation of 0.9% was obtained. This elongation not only completely eliminated undesirable variations in the blank, that is, edge corrugation (wavy edges) and central portion elongation (center buckles) described previously, but also decreased the material yield point to 19.1 kg., and increased the ultimate tensile strength to 38.0 kg., thereby greatly enhancing the mechanical properties of the blank material so as to be suitable for convenient shaping or pipe forming. These highly advantageous and satisfactory results can be readily attributed to the shaping of the blank through plastic deformation thereof under constant tension. The result of experiments made by the applicant indicated that without utilizing the set of three rolls of the example, the same degree of strain elongation could not be attained unless the roller diameter of the idler rollers was reduced to about 100 mm. and the degree of roller offset was increased to about 8 mm. The desirable specifications for roller diameter of the group of idler rollers, the extent of offset thereof, the roller diameter of the set of three rolls, and the required degree of offset of the cylinder actuated rollers may be readily determined by considering the gauge thickness of the blank strip, its mechanical properties, particularly its yield point and the peripheral speed of the driven pinch rollers. In any event, however, the working strain elongation effected should be equal to or more than 0.3% but not exceeding 2.0%. According to experimentation of the present applicant with working strains of less than 0.3%, the decrease in the material yield point was insignificant and accordingly the improvement in the physical properties of the blank strip was negligible and as a consequence unsatisfactory.

At the opposite extreme, where the working strain in the blank strip exceeded 2.0%, there was a tendency to increase the yield point of the material, and thereby detrimentally affect pipe manufacturing operations. The result of these experiments clearly indicated that it is highly advantageous to set the working strain at about 1% elongation in order to obtain the lowest yield point and to effect optimum shaping or pipe-forming conditions. An outstanding feature of this invention lies in shaping the strip into pipe while it is subjected to a tension which produces such a desirable working strain. This enables the ready manufacture of electric-resistance-welded steel pipes of superior quality irrespective of non-uniform strip gauge thickness in the direction of the blank strip width.

While the invention has been described in terms of a preferred embodiment thereof, it should be understood that the invention is by no means limited thereto and that many changes and modifications are obvious to one skilled in the art without departing from the true spirit and scope of the invention.

What is claimed is:

1. A method of manufacturing an electrically welded pipe: comprising passing a steel strip through a plurality of spaced sets of rollers, tensioning said strip by said rollers to impart a working strain to the strip in the range of about 0.3% to about 2.0%, and concurrently forming the strip into a pipe-shaped configuration while it is subjected to said working strain.

2. A method of manufacturing an electrically welded pipe as defined in claim 1 wherein said working strain is in the range of from about 0.5% to about 1.5%.

3. A method of manufacturing an electrically welded pipe comprising the steps of: (a) passing a pre-treated steel strip between a plurality of idler rollers having their upper and lower rollers located to provide a zig-zag feedpath; (b) then passing said strip through pinch rollers having a variable pass line to apply a working strain of from about 0.3% to about 2.0% to said steel strip, and (c) forming said steel strip into a pipe-shaped configuration while it is subjected to said working strain.

4. A method of manufacturing an electrically welded pipe as defined in claim 2 wherein said working strain is in the range of from about 0.5% to about 1.5%.

5. A method according to claim 3 comprising the step of adjusting said working strain by varying the pressure between upper and lower of said idler rollers.

6. A method according to claim 3 comprising the step of adjusting said working strain by providing an additional set of rollers intermediate said idler and pinch rollers.

References Cited
UNITED STATES PATENTS

| | | | |
|---|---|---|---|
| 2,177,545 | 10/1939 | Wright | 72—181 |
| 2,303,143 | 11/1942 | Spangler | 72—205 |
| 3,075,484 | 1/1963 | Benteler | 219—59X |
| 3,366,767 | 1/1968 | Corta | 219—59X |

MILTON S. MEHR, Primary Examiner

U.S. Cl. X.R.

72—181, 205